Feb. 24, 1942.     A. C. GILBERT     2,274,196
TRANSPARENT CONTAINER
Filed May 21, 1937     2 Sheets-Sheet 1
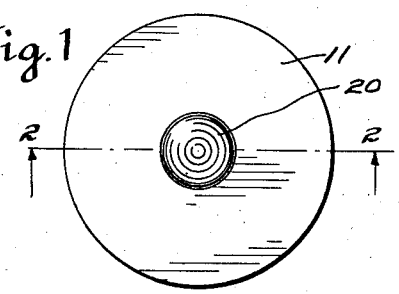
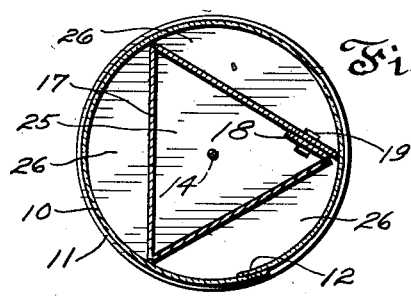
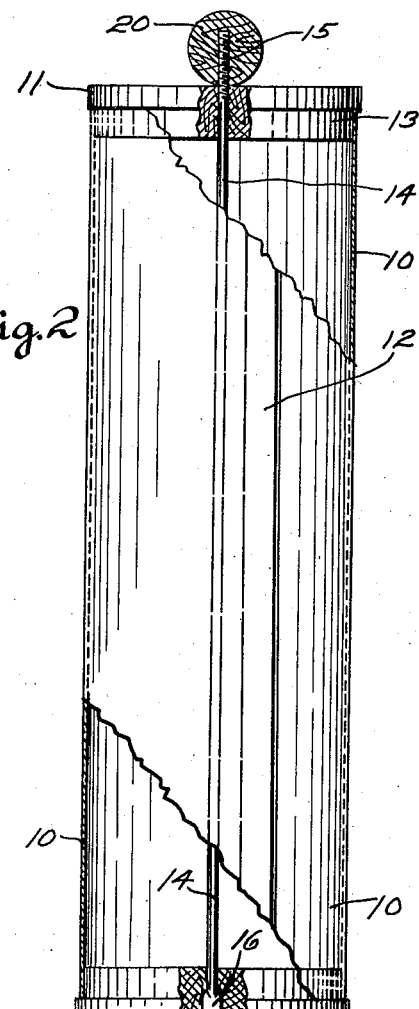
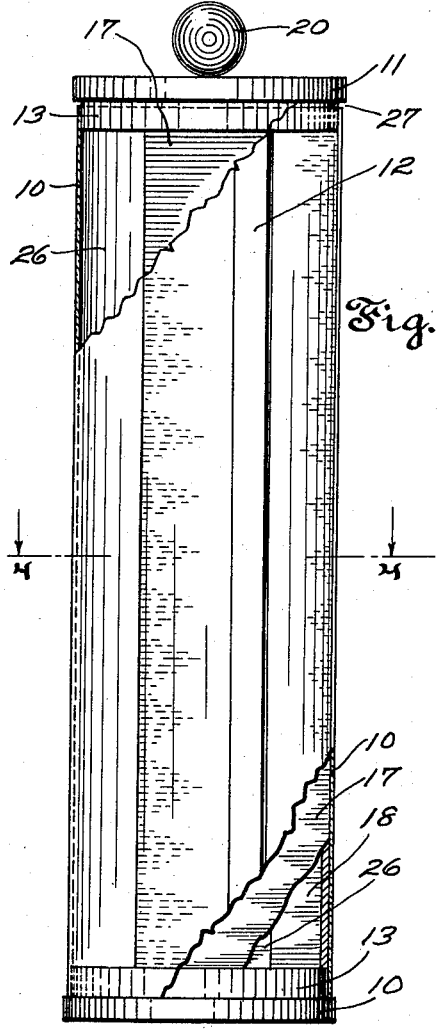
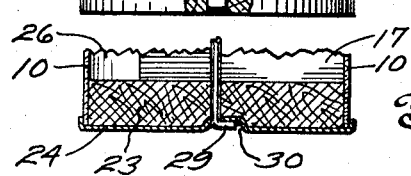
INVENTOR
Alfred C. Gilbert,
BY
ATTORNEY Feb. 24, 1942.  A. C. GILBERT  2,274,196
TRANSPARENT CONTAINER
Filed May 21, 1937  2 Sheets-Sheet 2

INVENTOR
Alfred C. Gilbert,
BY
ATTORNEY

Patented Feb. 24, 1942

2,274,196

UNITED STATES PATENT OFFICE 2,274,196

TRANSPARENT CONTAINER

Alfred C. Gilbert, Hamden, Conn., assignor to The A. C. Gilbert Company, New Haven, Conn., a corporation of Maryland Application May 21, 1937, Serial No. 143,897

8 Claims. (Cl. 206—44)

This invention relates to transparent containers in general and more particularly to re-usable constructions of such containers and specifically to containers designed to possess particular appeal to the eye and mind of small children as distinguished from throw-away container constructions designed for purely utilitarian packaging purposes.

One object of the invention is to utilize a cylinder of thin, transparent material open at both ends, as the sole encompassing wall of the container without the necessity of resorting to stiffening expedients of opaque nature or otherwise, and without depending upon stiffening or deforming attachments to maintain or modify its cylindrical form.

Another object is to employ as the sole encompassing wall of a container, a transparent cylinder or tube of the above nature comprised of a single ply sheet of pliant transparent material stiff enough to hold its shape unaided when flexed to tubular form, and whose edges meet and overlap to form a transparent seam throughout the length of the cylinder.

Another object of the invention is to provide end structures for closing or plugging the open ends of the transparent cylinder by abutment thereagainst in freely separable relation thereto.

Another object is to maintain the abutting relationship by a tie-rod or tie-bolt coaxial with the transparent cylinder and attached to, or penetrating, each of the said end structures, together with means associated with the tie-rod for retaining one or both of the end structures.

Another object is to make the said end structures of light weight, block-like material such as wood and of solid appearance, which structures may be brightly colored to combine with the reflective nature of the transparent cylinder to produce a toy-like appearance suggestive of play articles to the mind of a child, and to accentuate this effect by providing a block or ball-shaped knob as the retaining means cooperating with the tie-bolt to hold the end structure against the transparent cylinder.

A further object is to provide means for dividing a container possessing any of the foregoing characteristics into a plurality of compartments, some exposed through the transparent cylinder and another or others concealed from view.

A further object is to produce these compartments by the use of relatively stiff partition walls extending from end to end of the container inside the transparent cylinder and joined to form a hollow structure of prismatic nature whose outermost edges are contiguous to the inner surface of the transparent cylinder and thereby adapted to reinforce the same against crushing pressure from without.

A still further object is to so relate the overall length of the partition walls to the overall length of the transparent cylinder that the end blocks of the container shall be sufficiently spaced by the partition walls to prevent them from bringing pressure to bear against the ends of the transparent cylinder, when said end structures are drawn toward each other by the tie-bolt and its cooperative retaining means.

The foregoing and other objects of the invention will become clear from the following description in which reference is had to the accompanying drawings, wherein:

Fig. 1 is a plan view of my improved container.

Fig. 2 is a view in elevation taken partly in section on the plane 2—2 in Fig. 1 and shows the transparent wall of the container partially broken away.

Fig. 3 is a side elevation of a modified form of container divided into interior compartments and shows the transparent outer wall and the inner partition wall partly broken away.

Fig. 4 is a plan view taken in section on the plane 4—4 in Fig. 3.

Fig. 5 shows a modification of the end structure.

Figure 8:
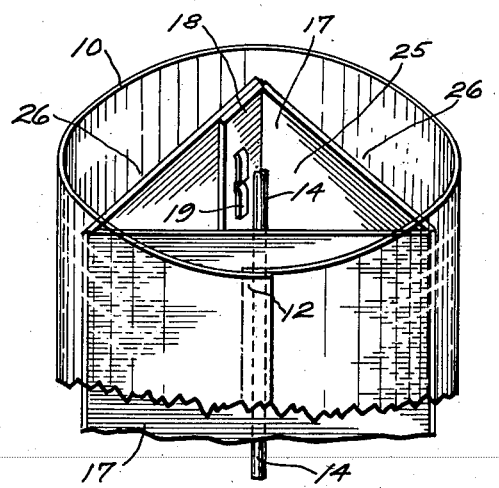
Fig. 8 is a fragmentary perspective view of the top portion of the container of Fig. 7 showing the top end structure removed and the walls and tie-rod broken away.

Containers have heretofore been made with transparent walls but it has been considered necessary to produce the transparent walls by molding a transparent plastic to cup-like shape, or to forcibly squeeze the cap receiving end of transparent closure walls if made of transparent sheet material and to reinforce the meeting edges of the sheet material by metallic or opaque fastening strips, all of which features are objectionable for the present purposes of rendering a container easily taken apart and easily put together again by a child. When very thin transparent sheet material has been employed as the outer wall of the container, it has been considered necessary to introduce interior structure for stretching the sheet material between circumferentially spaced points to enable it to retain its form, or in other cases to wrap a sheet of thin, flexible, transparent material closely around and in surface contact with the contents of the package.

I have discovered that transparent sheet material such as Cellophane and like substances may be flexed into cylindrical form with overlapping edges bonded together by heat and if desired by a transparent adhesive, and without reinforcement or permanent attachment of either cylindrical end to any closure structure, serve satisfactorily as the enclosing wall of a container even if the sheet material be so thin as not to exceed ten one-thousandths of an inch in thickness. Great economy is thereby effected in the quantity production of transparent containers and the additional objectives become possible which have hereinbefore been mentioned. This is made possible by combining a plain ended tube 10 with a particular construction of end blocks 11 cooperating with the ends of the tube in the following manner.

The transparent sheet material of which tube 10 is made is overlapped at the seam 12 and its edge portions bonded together along this seam throughout the length of the tube. The end blocks 11 may be alike, consisting of a block-like disc of wood or suitably light weight material having the rabbet 13 of proper diameter to fit into the end of the transparent tube in freely separable relation thereto as shown in Fig. 2. The annular shoulder on each end block will bear against the free edges of the tube and may be pulled thereagainst by the tie-rod 14 which passes through a central hole in each end block and is threaded at its top end 15 which projects above the top end block. The lower end of tie-rod 14 may be flattened or swadged at 16 which end is thus embedded and prevented from turning in the lower end block. A ball-like knob 20 which may also be made of wood has threaded engagement with the end 15 of tie-rod 14 and by screwing on to the latter brings the end blocks to bear against the edges of the transparent tube making a rigid container that may be quickly taken apart and put together again by a child. Such lateral support as is given to the ends of the transparent tube by the unattached telescopic assemblage therewith in freely separable relation thereto of the end block rabbet 13, may aid the tube to resist crumpling or distortion when the tube is made of unusually thin material or subjected to unusually heavy lengthwise compressive stress. A knock-down container composed of repeatedly usable parts having transparent walls is thus produced at minimum cost and may be assembled by quick and simple manipulation involving no use of tools nor of bonding agents. Such container will serve for repeatedly packaging, delivering up and repackaging toy articles and together with its contents possesses lasting worth as a plaything. The complete transparency of the side walls combined with the solid or block-like appearance of the end structures conveys to the mind of the child an impression of playthings and mysticism.

For rendering a container of this type better suited to the confinement of small articles of concentrated weight such as the component parts of metallic constructional toys or the like, I may introduce a partitioning structure such as that shown at 17 in Figs. 3, 4, 6, 7 and 8. While such a structure may be produced in a variety of ways, that disclosed herein comprises a sheet of heavy cardboard scored lengthwise and bent along its score lines to form a hollow structure or frame of prismatic nature, in this case triangular in cross section, whose overlapping edge 18 may be fastened by bendable metallic pieces 19 which penetrate the cardboard at spaced points in the length of the frame. Eyelets or glue will serve the same purpose.

When a hollow frame structure of this nature is used, the transparent encompassing tube may if desired be relieved of all strain of compression by the end blocks 11 if the frame is made long enough to space the end blocks apart to the extent shown in Fig. 3 where a small gap 27 is seen to be provided between the top end of the transparent tube 10 and the rabbet shoulder on block 11. In the absence of an inner frame structure to provide this gap, pressure of the end blocks against the edges of the transparent cylinder may be prevented if desired by arranging the retaining ball 20 to be limited in the extent to which it may screw down over the tie-rod 14 either by providing a threaded hole of less depth in the ball of Fig. 2 or forming threads upon the tie-rod of less extent from the top end thereof.

Any or all of the partition walls of the inner structure 17 herein sometimes referred to merely as "partitions" may be perforated as at 21 or scored as at 22 to provide anchorage for fastening contents of the container to the frame structure thereby keeping them arranged in orderly relationship and preventing them from shaking loose or coming into contact with the surrounding transparent tube.

It will be plain from Fig. 4 that if the partition frame structure be of such size in cross section as to bring its corner or partition intersection edges contiguous to the inner or concave surface of the transparent cylindrical container walls while each partition is flat and coextensive with a straight line chord in relation to the circular cross section of the container, a considerable internal reinforcement is thus afforded to the container as a whole against crushing strains or blows received from the outside.

Figure 9:
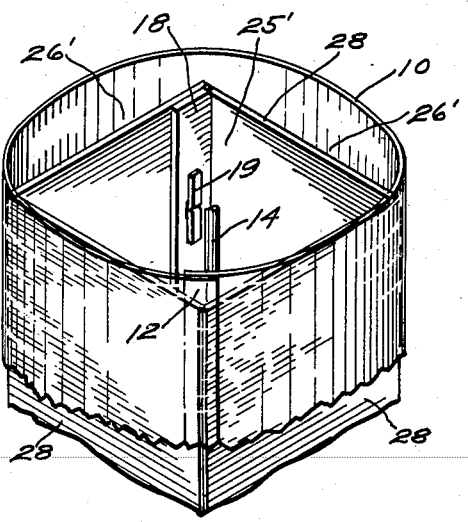
Fig. 9 is a view similar to Fig. 8 showing a modified arrangement of the inner partition walls.
Figure 7:
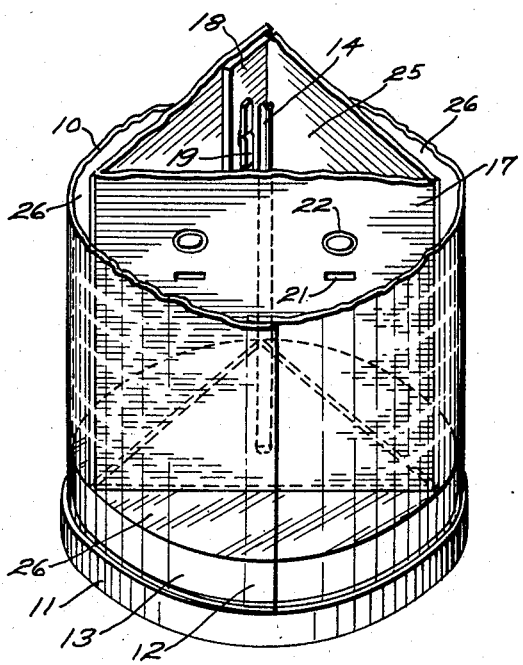
Fig. 7 is a fragmentary perspective view of the bottom portion of the container turned to a still different circumferential position and is drawn on an enlarged scale showing the transparent outer wall and the inner compartment walls broken away.
Figure 6:
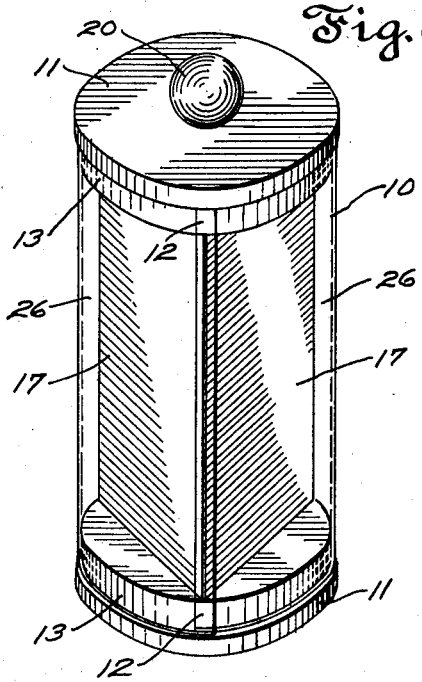
Fig. 6 is a perspective view of the container of Fig. 3 viewed from a different point circumferentially.

Fig. 9 indicates that similar advantages may be obtained from a prismatic frame structure 28 of different cross sectional shape, that of Fig. 9 being a square which is equally capable of having its corner or partition intersection edges closely adjacent to a hollow cylindrical form of transparent container wall. As in Fig. 4, the partition walls in Fig. 9 are disposed in chordal relation to the arc of curvature of the transparent outer wall of the container.

In Fig. 5 is indicated a modified form of the end structures in which one or both thereof may be comprised of two parts instead of an integral piece. This construction proposes the use of a plain thick disc 23 to replace the rabbet formation of the end blocks 11, and this disc will correspondingly fit the transparent tube 10. The associated cap 24 may be of thin drawn metal and slightly overhang the outer surface of the end of the transparent tube for more fully protecting the latter and retaining it against distortion from forces of compression exerted by the end caps. In this construction it will further be noted that the lower end 29 of tie-rod 14' is bent at right angles to hook into a socket 30 formed in the metal of cap 24 to receive and fit the same. The lower end of rod 14' might be headed over or otherwise arranged for pulling engagement with cap 24. This two-piece form of end structure may be employed with or without the inner frames 17 or 28. When the construction of Fig. 5 is used without an inner frame, the tie-rod 14' may be shouldered or carry in threaded engagement therewith, a nut for taking the lengthwise thrust of disc 23 inwardly, thereby if desired, to relieve tube 10 from inward endwise pressure.

An important feature of my improved container for general purposes is the provision of a concealed inner compartment 25 separated from the outer compartments 26 by walls of substantial strength if desired, relieving the transparent tube from the necessity of contacting with any articles in any of the compartments 25 or 26. It is not necessary for this and related advantages of the invention, that the transparent closure wall completely encompass the container, for these principles of the improvements may be seized upon if a portion of the lateral wall of the container be flat, or opaque, or made of different and heavier material than the transparent cellulose sheet of the tubular member 10. In such case the container may rest in horizontal position upon such flat or heavier lateral wall in place of standing upright on one of its smaller ends as shown in the drawings.

Thus the principles of construction may be embodied in containers of many proportions and varied forms, all of which may benefit from my discovery that transparent sheet material of a surprisingly thin gauge is capable of standing up and producing the stiffness requisite to the uses proposed herein when combined with end structures and retaining means of the character illustrated in these improvements. It is intended by the appended claims to cover all equivalent shapes, substances and arrangements which are new with these improvements and would be suggested by the disclosures hereof to those skilled in the art. Without limitation, therefore, to the exact structures disclosed in the drawings, I claim as my invention:

1. A knockdown display container comprising a readily reusable assemblage of freely disconnectable parts, including in combination, an open ended tubular member composed of transparent sheet-like material sufficiently thin and flexible to enable said member to be distorted easily by flexure of said material when the latter is unsupported, a base wall transverse said tubular member conjoined with one end thereof to close said end, a head device shaped and disposed to abut against the terminal edge of said material at the open opposite end of said tubular member and including a plug-like body fitting removably and telescopically into and sufficiently filling said open end to afford internal support for the marginal portion of said material thereat, and retractable means for releasably retaining said head device constructed and arranged to press the latter against said edge of the material in a direction to subject said tubular member to compressive force of telescoping nature, said support of the material by said plug-like body preventing the material from yielding flexibly in response to said compressive force.

2. A knockdown display container as defined in claim 1, in which the said head member comprises a solid stepped block having a rabbet portion fitting telescopically within the open end of the said tubular member in freely separable relation thereto and having a portion of larger compass forming an annular shoulder disposed to register with and to abut axially against the terminal edge of the transparent tubular member at its said open end, said block portion of larger compass projecting a sufficient axial extent beyond the end of said tubular member to afford by its periphery a good finger grip for handling the container without need of grasping said tubular member.

3. A knockdown display container as defined in claim 1, in which the said open ended tubular member is composed of a single ply of flexed transparent sheet material forming outwardly curved walls of sufficient thickness in proportion to their flexed curvature to enable said tubular member to maintain the same shape when removed from the said assemblage as it possesses when incorporated in the said assemblage.

4. A knockdown display container comprising a reusable assemblage of parts including, a transparent tube composed of single ply transparent cellulose sheet material having opposite marginal edges respectively constituting opposite open ends of said tube, a thick rabbeted block of solid material shaped and disposed in part to fit telescopically within one open end of said transparent tube in freely separable relation thereto and in part to abut against said marginal edge of the sheet material in a manner to avoid pressing thereagainst in directions other than parallel with the axis of said tube, a similar block of solid material shaped and disposed to cooperate in like manner with the opposite open end of said transparent tube, a tie rod anchored to one of said blocks and penetrating the other block, and a nut-like member having threaded engagement with said tie rod at the exterior of the last said block thereby to force the blocks toward each other against the intervening resistance of said transparent tube.

5. A knockdown display container as defined in claim 4, in which the said nut-like member has a spherical surface curvature at its point of contact with the block against which it bears thereby to equalize the axial pressure exerted by the block round about the end of the said transparent tube.

6. A knockdown display container comprising a readily reusable assemblage of parts including, a tube having opposite open ends composed of transparent sheet-like material sufficiently thin and flexible to enable said tube to be distorted easily by flexure of said material when the latter is unsupported, a removable base device forming a closure for one end of said tube, a removable head device forming a closure for the opposite end of said tube, said base and head devices being shaped and disposed to abut against respectively opposite marginal edges of said material and each of said devices including a plug-like body fitting removably and telescopically into and sufficiently filling the corresponding end of the tube thereby to afford internal support for the marginal portion of said material thereat, and means including a tie rod and associated retractable fastener constructed and arranged to force said base and head members releasably toward each other and against the respectively opposite marginal edges of the material, said tie rod being disposed centrally of said members and tube thereby to cause equalization of the axial pressure exerted by each of said devices over the entire edge of said material against which the device abuts.

7. A display container including in combination, a transparent cylindrically curved closure wall of circularly complete cross section and composed of pliant transparent sheet material extending from one end to the opposite end of said container, and a hollow prismatic stiffening structure inside said closure wall comprised of conjoined flat partitions each of said partitions extending between said ends of the container and being coextensive with a straight line chord in relation to the circular cross section of said member, said flat partitions meeting to form intersection edges of said structure contiguous to said wall thereby to enable said prismatic structure to reinforce said container internally against crushing pressure from without, and an anchorage on at least one of said partitions for securing the contents of said container thereto whereby said contents are maintained in fixed relation to said partition between the partition and the transparent closure wall.

8. A knock-down display container comprising in combination, a reusable assemblage of parts including a hollow elongated member of circular cross section open at one end and having transparent sides of cylindrical curvature, a closure wall extending across the opposite end of said member presenting a planar surface to the interior thereof, a head member located at and separable from said open end of the member presenting a planar surface to the interior thereof, means including a retractable retainer constructed and arranged to exert a pulling force on said head member for drawing the latter toward said closure wall, and an elongated stiffening structure inside of said member comprising conjoined flat partitions extending from the said closure wall to said head member and terminating in edges occupying a common plane which edges abuttingly engage said planar surfaces of said wall and member so that said structure holds said wall and member spaced apart against said pulling force of the retainer without occasioning thrust on any of said partitions in directions oblique thereto, each of said partitions being coextensive with a straight line chord in relation to the circular cross section of said member and meeting each adjacent partition angularly in a manner to form intersection edges of said structure extending contiguous to said transparent member sides for internally supporting the latter against crushing, whereby an isolated segmental chamber is formed between each of said partitions and said transparent member sides in which chamber the contents of said container may be contained and displayed.

ALFRED C. GILBERT.